United States Patent [19]

Curtis

[11] Patent Number: 4,802,345
[45] Date of Patent: Feb. 7, 1989

[54] NON-TEMPERATURE CYCLING CRYOGENIC COOLER

[75] Inventor: Daniel L. Curtis, Manhattan Beach, Calif.

[73] Assignee: Hughes Aircraft Company, Los Angeles, Calif.

[21] Appl. No.: 128,233

[22] Filed: Dec. 3, 1987

[51] Int. Cl.⁴ .............................................. F25B 19/00
[52] U.S. Cl. .................................... 62/514 R; 250/352
[58] Field of Search ........................ 62/514 R; 250/352

[56] References Cited

U.S. PATENT DOCUMENTS

| 3,258,602 | 6/1966 | Promish | 250/352 |
| 3,727,058 | 4/1973 | Schrey | 62/514 R |
| 3,970,850 | 7/1976 | Jordan | 250/352 |
| 4,495,988 | 1/1985 | Grossman | 62/514 R |
| 4,658,601 | 4/1987 | Burchell et al. | 62/514 R |
| 4,716,742 | 1/1988 | Germain-Lacour et al. | 62/514 R |

Primary Examiner—Ronald C. Capossela
Attorney, Agent, or Firm—Lewis B. Sternfels; W. J. Streeter; A. W. Karambelas

[57] ABSTRACT

A cryogenic cooler (10) includes a dewar (14) spaced from a cold finger (12). In the space (18) between the dewar and the cold finger, a trace amount of a noncondensable gas, preferably neon, is added to the air to maintain the thermal conductivity between the cold finger and the dewar and thereby to prevent temperature cycling in the cooler.

7 Claims, 1 Drawing Sheet

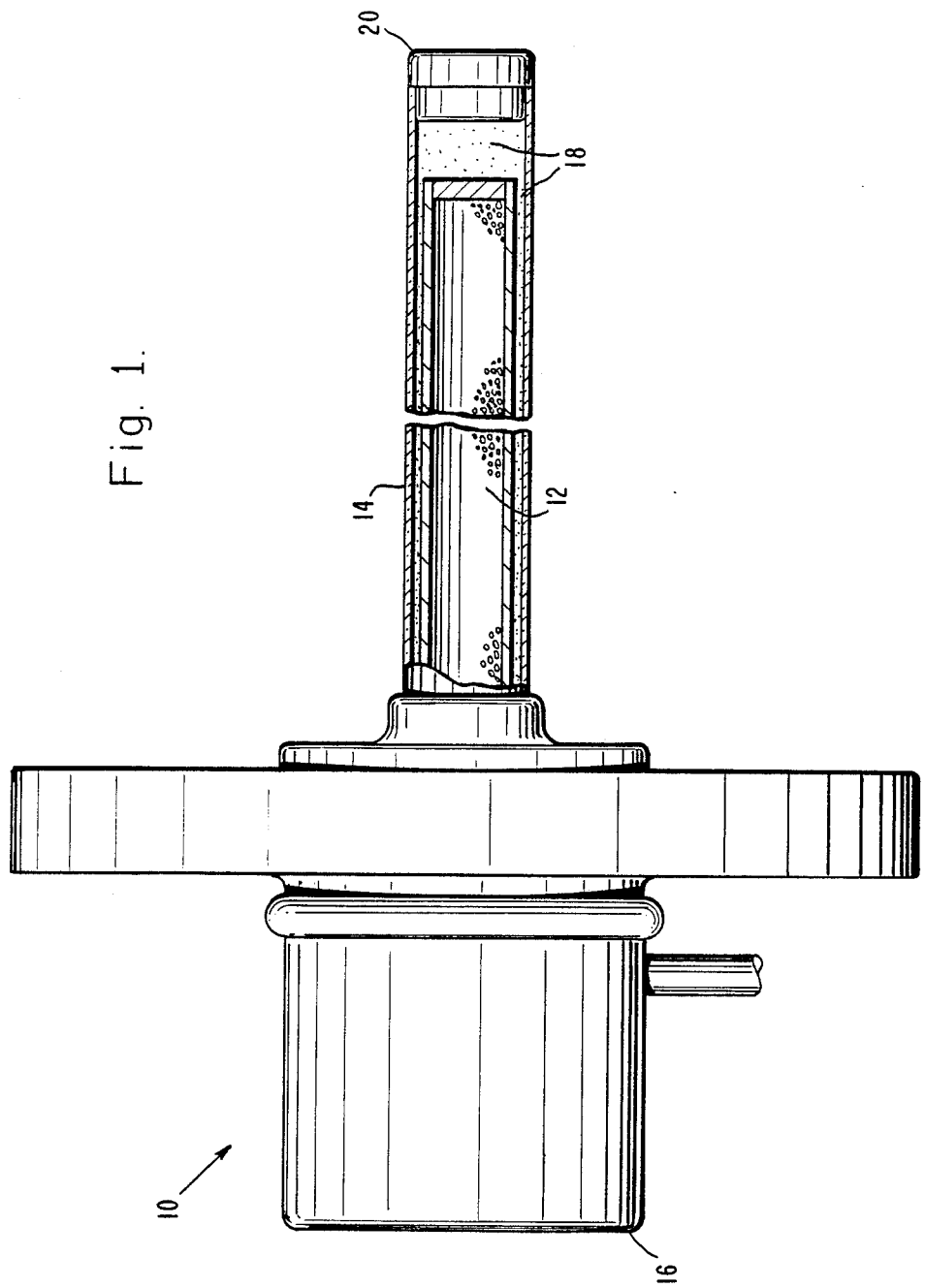

NON-TEMPERATURE CYCLING CRYOGENIC COOLER

BACKGROUND OF THE INVENTION

The present invention relates to cryogenic coolers and, in particular, to improvements therein for preventing temperature cycling.

Some cryogenic coolers, for example, sterling cycle, pressurized helium coolers, exhibit the undesirable phenomenon of temperature cycling above and/or below a specified temperature. A typical cooler includes a cold finger spaced from a dewar, with air in the space as a thermal conductor. Helium is used as the cooling medium in the cold finger. Detectors used in infrared imaging systems are secured to the dewar so that they can remain at a temperature of about 70° K. Otherside, the detectors may improperly sense infrared radiation. Such coolers can cool down to a temperature of 60° K., and then start temperature cycling with excursions which vary in excess of 40° K. during periods in the order of one minute. Such temperature cycling is believed to be caused by a liquification of the air between the cold finger and the dewar. Because the most prevalent gas in air, nitrogen, liquifies at 77° K., when the cooler temperature drops below 77° K., liquid nitrogen forms on the dewar and results in a loss of gas which prevents heat transfer between the cold finger and the dewar. This loss of thermal conductivity allows the dewar temperature to rise to a point where the liquid again vaporizes, heat transfer resumes, the temperature drops until the gas again liquifies, and the cycle is repeated.

This temperature cycling is unacceptable and must be prevented. As stated above, cryogenic coolers are used to maintain the temperature of infrared detectors at a sufficiently uniform cryogenic temperature, so that the detection of infrared radiation will not be subject to error.

SUMMARY OF THE INVENTION

The present invention overcomes this and other problems by using a gas which will not liquify in the cryogenic cooler at or near its operating temperature, and which will not otherwise deleteriously affect any operation or parts of the cooler.

In the cooler described above, the operating temperature is at 70° K. and is in the region of the cold finger-dewar interface. At this operating temperature, only three gasses meet this non-liquifying requirement, viz., hydrogen, helium and neon. Any one of the three is acceptable so long as the material of the dewar is constructed of a material which is impervious to the gas used. However, because glass is the typical dewar material, because it acts both as an electrical insulator and enables infrared energy to pass therethrough and because helium and hydrogen can diffuse through the glass, neon is the preferred gas.

While the entire space between the cold finger and the dewar can be filled completely with the neon gas, it is sufficient to utilize sufficient neon with existing air so that there is sufficient neon to act as a thermal conductor, even if the air should condense. Thus, it is possible to economize on the amount and type of gasses used.

Several advantages are derived from the use of such a gas which will not liquify or condense. Primarily, temperature cycling of cryogenic coolers are prevented. Uniform cooling temperatures are maintained. Infrared detector sensing remains accurate.

Other aims and advantages, as well as a more complete understanding of the present invention, will appear from the following explanation of an exemplary embodiment and the accompanying drawing thereof.

DESCRIPTION OF THE DRAWING

The sole FIGURE illustrates a cryogenic cooler in which the present invention is used.

DETAILED DESCRIPTION OF THE PREFERRED EMBODIMENT

As shown, a cryogenic cooler 10 includes a cold finger 12 surounded by and spaced from a dewar 14, typically of glass. Helium is inserted into the cold finger from a supporting end 16, and the cold finger and dewar are supported by end 16. Dewar 14 is spaced from cold finger 12 by an tubular space 18, which contains a gas. The gas acts as a thermal conductor so that the dewar can be cooled to the cooler's operating temperature by the cold finger. Typically, such a gas comprises air which provides for the necessary thermal conductivity. Devices to be cooled, such as infrared detectors, are disposed to be secured to an end 20 of dewar 14, and kept at the operating temperature. For infrared detectors, a typical cooling temperature is 70° K.

To maintain thermal conductivity between the cold finger and the dewar, a small amount of neon is added to the air to prevent liquification of all gases and, therefore, to prevent temperature cycling. This small amount of noncondensible gas, as a part of the environment separating the cold finger and the dewar, remains in its gaseous state at the 70° K. operating temperature of the cooler. Since the thermal conductivity of a gas is essentially independent of its pressure to a point where the molecular mean free path is comparable to dimensions over which thermal conduction can take place, a trace amount of a nonconensable gas, having a liquifying temperature considerably lower than 70° K., is added to the dewar/cold finger environment. The amount need not be large, comprising, for example, 5% to 10% by volume, to support an essentially constant thermal conduction, even if the majority of the gas, oxygen and nitrogen, remains in a liquid state.

Three noncondensable gasses have been found to be useful, hydrogen, helium and neon whose boiling points are respectively about 21° K., 5° K. and 27° K. Because hydrogen and helium can pass through the dewar glass wall, and, therefore, may contaminate the detectors, neon is the preferred gas.

Although the invention has been described with respect to a particular embodiment thereof, it should be realized that various changes and modifications may be made therein without departing from the spirit and scope of the invention.

What is claimed is:

1. In a cryogenic cooler which includes a dewar spaced from a cold finger and which is arranged to operate at an operating temperature, the improvement in maintaining thermal conductivity between the cold finger and the dewar and thereby to prevent temperature cycling in the cooler, comprising a gas having the characteristic of remaining in its gaseous state at the operating temperature and, therefore, to remain in its thermally conductive state.

2. The improvement according to claim 1, in which the dewar is constructed of a material which is impervious to said gas.

3. The improvement according to claim 2 wherein the cold finger is maintained at a temperature which is approximately equal to or below the temperature at which air liquifies, in which the dewar comprises glass and said gas consists of neon, said neon gas being mixed with air.

4. The improvement according to claim 2 wherein the cold finger is maintained at a temperature which is approximately equal to or below the temperature at which air liquifies, in which said gas comprises one of hydrogen, helium and neon, said gas beig mixed with air.

5. The improvement according to claim 1 for maintaining an infrared detector at the operating temperature and, therefore, for ensuring error-free detection of infrared radiation by the detector, comprising an attachment of the detector to the dewar.

6. In a cryogenic cooler which includes a dewar spaced from a cold finger and which is arranged to operate at an operating temperature for cooling an infrared detector, the improvement in maintaining thermal conductivity between the cold finger and the dewar and to prevent temperature cycling in the cooler and thereby to ensure error-free detection of infrared radiation by the detector, comprising a gas having the characteristic of remaining in its gaseous state at the operating temperature and, therefore, to remain in its thermally conductive state and to maintain the detector at the operating temperature for ensuring its error-free detection.

7. In a cryogenic cooler which includes a dewar spaced from a cold finger for reception of a thermally conductive gas therebetween and which is arranged to operate at an operating temperature, a method for maintaining thermal conductivity between the cold finger and the dewar and thereby to prevent temperature cycling in the cooler, comprising the step of using a thermally conductive gas having the characteristic of remaining in its gaseous state at the operating temperature and, therefore, for maintaining thermal conduction between the cold finger and the dewar.

* * * * *